Oct. 15, 1940.  W. T. HENDERSON  2,218,470
SLUG CUTTING MACHINE
Filed Nov. 13, 1937  3 Sheets-Sheet 1
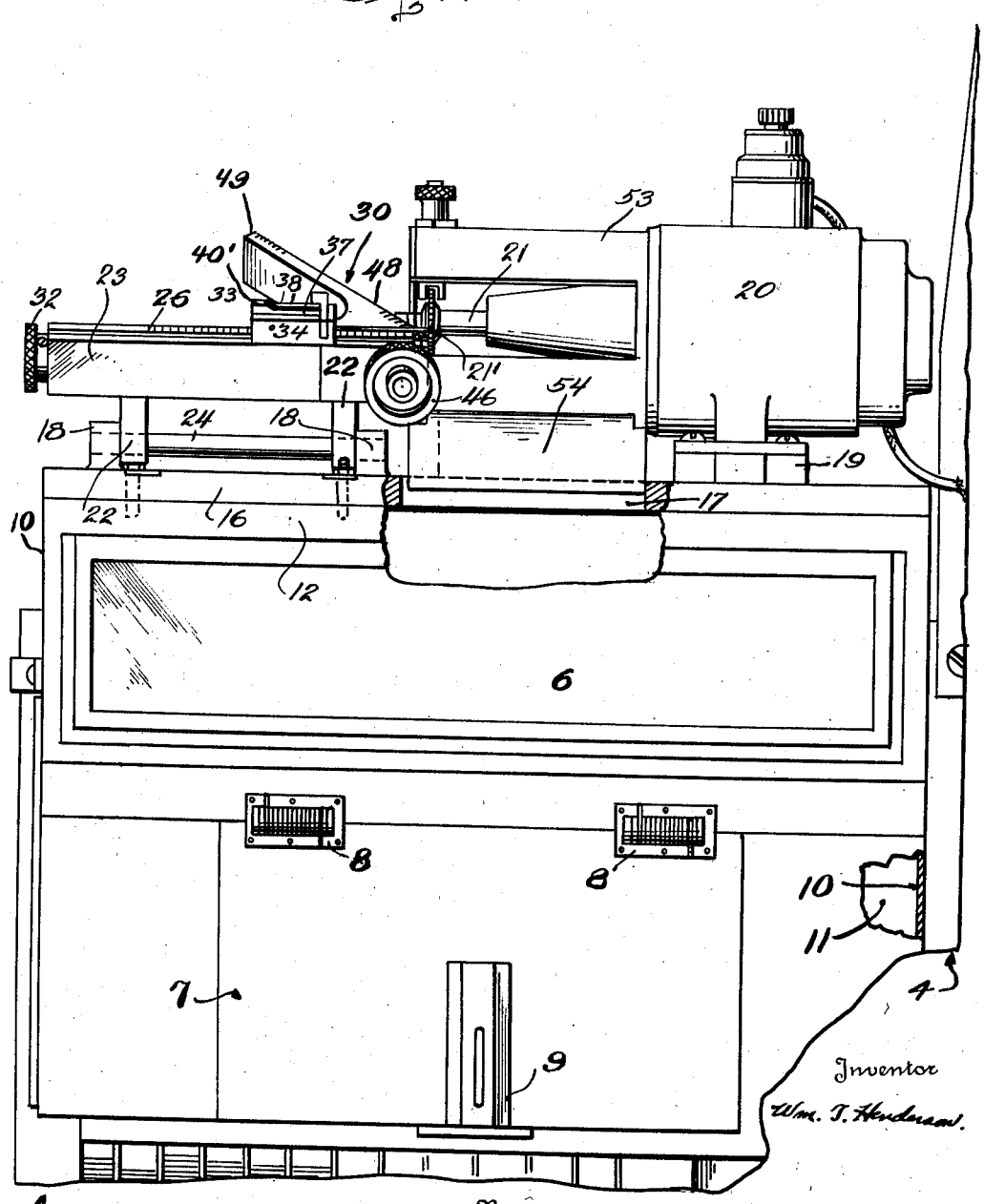

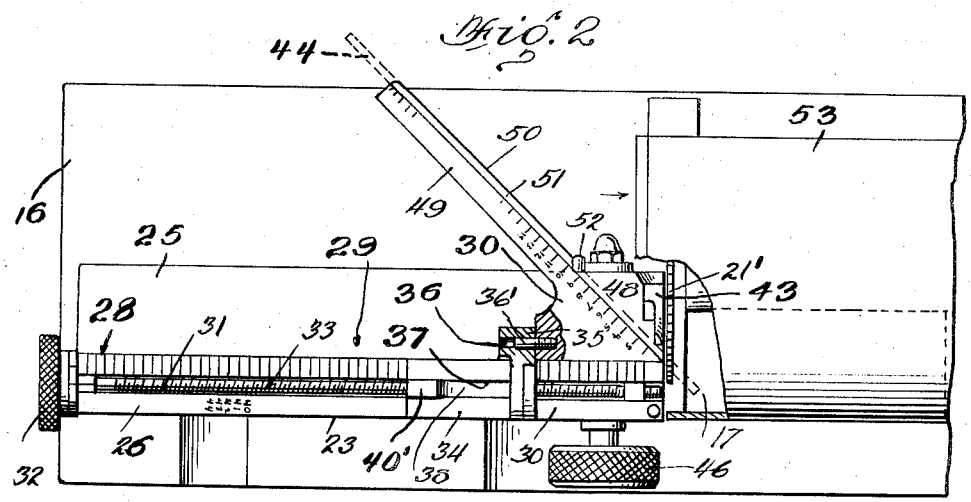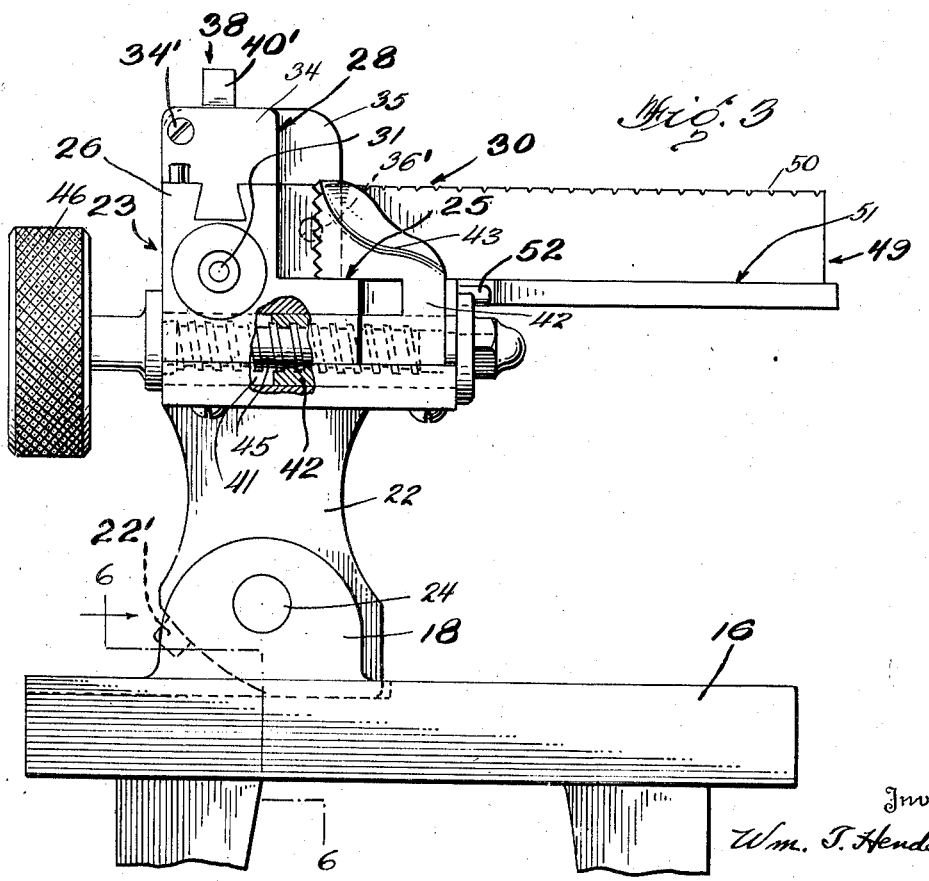

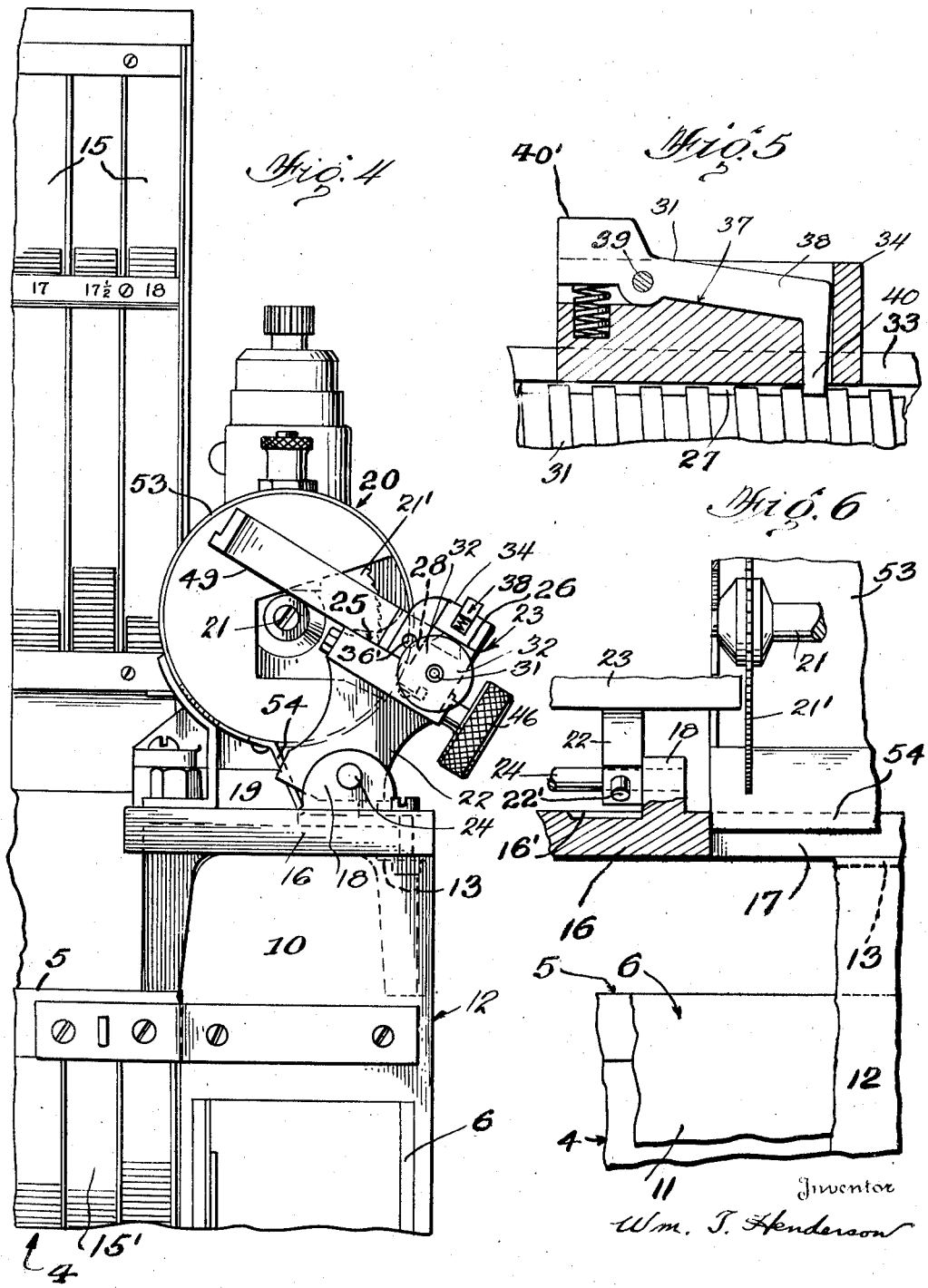

Patented Oct. 15, 1940

2,218,470

UNITED STATES PATENT OFFICE 2,218,470

SLUG CUTTING MACHINE

William T. Henderson, Washington, D. C.; Mabel K. Henderson, Washington, D. C., administratrix of William T. Henderson, deceased Application November 13, 1937, Serial No. 174,437

4 Claims. (Cl. 29—69)

My invention relates to cutting machines and more particularly to slug cutting machines used in connection with setting-up printing forms.

It has been the practice, in the printing art, to cut slugs and the like, used for forming borders or boxes, by various hand tools or cutting machines. These machines are of various designs and are manually or power operated. The latter class is usually constructed with a power operated saw and equipped with a work-holder on which a slug is adapted to be positioned and cut a desired length. The saw is usually of the rotating type and cuts the slugs transversely in a manner to form a right angular disposed end face. However, in some instances, machines of this latter type are equipped with mechanism whereby the same may be adjusted to permit the saw to cut the slug in a manner to form an inclined or mitre face. These machines are complicated and require considerable time and skill in adjusting the same from one type of face cutting operation to another as above described and also for effecting a proper adjustment to secure the desired length of slug when cut. During the cutting operation, the waste end of the slug together with the dust, chips and the like, commonly known as the scrap, drops onto the base of the machine, subjacent the saw, and accumulates about the saw. This accumulation of scrap about the saw often results in damage to the saw due to contact therewith and the scrap is often discharged or brushed from the machine and scattered over the surface of the floor to present an untidy appearance and unsanitary condition.

My invention overcomes these many disadvantages and undesirable features in that I provided means whereby my machine may cut slugs with the desired faces by the use of a minimum number of parts and adjustments, and further, to dispose of the waste and scrap during the slug cutting operation thus preventing the same from accumulating about the saw and a possible scattering of the same over the floor and working parts of the machine.

One of the principal objects of my invention is to provide a slug cutting machine equipped with quickly adjustable means whereby slugs may be cut into desired lengths and with right angle or mitre faces as desired.

Another object of my invention is to provide a device of the above described character equipped with supporting means fashioned in a manner to prevent accumulation of scrap about the cutting element and at the same time forming a work-table for use in composing.

A further object of my invention is to provide a device that is simple in operation, durable in construction, efficient in use and economical in manufacture.

Other objects and advantages will be apparent from the following description, appended claims and annexed drawings.

Referring to the drawings, wherein like reference characters designate like parts throughout the same;

Figure 1 is a side elevation of my invention,

Figure 2 is a top plan view thereof,

Figures 3 and 4 are end elevations,

Figure 5 is a detail sectional view of the carriage,

Figure 6 is a detail sectional view taken on the line 6—6 of Figure 3.

In practicing my invention, I provide a support which in the present instance, constitutes an ad stand 4, equipped with a work-top 5. Secured to one side of said stand is a reservoir or scrap box 6, the top of which is open and said scrap box is provided with a door 7, normally urged into closed position by means of spring actuated hinges 8, and secured in said position by a latch 9. The scrap box is provided with end, rear and front walls 10, 11 and 12 respectively. The front wall 12, at the upper edge thereof, is formed with a right angular and inwardly extending ledge section 13 for a purpose hereinafter set forth. Mounted on the top 5 are a plurality of upwardly extending slug racks 15 for accommodating slugs of various sizes and likewise, secured to said stand, subjacent said top, is a plurality of similar racks 15'.

Superposing the scrap box 6 is a bed 16 formed with an intermediate elongated opening 17 extending therethrough and registering with the open top of said scrap box. The bed 16 is fashioned with depending feet at the corners thereof, the rear pair of said feet supporting the rear longitudinally extending edge of the bed on the top 5 and the ledge section 13 supporting the front longitudinally extending edge of said bed. Suitable screws are provided to secure the rear pair of legs to the top 5 and the ledge section 13 to the bed. In this arrangement of the parts, the bed 16 is supported in spaced relation above the top 5 and the rear wall 11 terminates at the upper end thereof flush with the top 5 thereby forming an elongated opening, defined by the upper face of the top 5, lower face of the bed 16 and opposed inner faces of the rear pair of legs, through which scrap from the top 5 may be swept or discharged into the scrap box.

The bed is provided, at one end, with a pair of upwardly extending brackets 18 and, at the opposite end, with a motor mounting 19 on which is secured an electric motor 20. The motor is provided with the usual drive shaft 21 on the end of which is secured, for rotation therewith, a slug cutting element or saw 21'. A suitable electric cable connects the motor to a source of power for operating the same.

Interposed between the brackets 18 is a pair of depending lugs 22 formed on the under face of a work-holder 23. The lugs are pivotally connected to the brackets by means of a shaft 24 whereby said work-holder is adapted for rocking movement to and from the saw 21'. A pin 22' extends from one of the lugs 22 for engagement with a wall of a slot 16' formed in the upper face of the bed to limit the rocking movement of the work holder away from the saw 21' the weight of said work holder serving to normally position the same away from said saw.

The work-holder is of a substantially rectangular configuration and the top face 25 thereof is fashioned, at one side, with a longitudinally extending section constituting a rail 26 formed with a longitudinally extending bore 27, said rail having a side wall 28 forming a shoulder right angularly disposed in relation to the top face 25. Said shoulder and top face form a seat 29 adapted to receive one or more slugs and a mitre block or auxiliary carriage 30, as hereinafter described.

Mounted in the bore 27, is an adjusting screw 31 having the ends thereof journaled in the end walls of the rail, one end of said screw being equipped with a finger piece 32 whereby said screw may be rotated. The top wall of the rail is formed with a longitudinally extending slot 33 communicating with the bore 27 and in which is slidably mounted a dove-tailed section of a carriage 34. Said dove-tailed section is formed on the lower face of the carriage and said lower face is slidably mounted on the upper face of the rail. One side of the carriage has pivoted thereto, by means of a screw 34', a depending section 35 having an opening 36 formed therein for receiving a pin 36' carried by the mitre block or auxiliary carriage 30 hereinafter described. Said section is normally positioned within the seat 29 for engagement with one or more slugs or the mitre block 30 as the case may be. However, in instances where it is desired to cut extra long slugs, the section 35 may be moved upwardly about its pivot 34' and maintained out of the seat 29, thereby permitting an extra long slug to be positioned within said seat 29 to be cut by the saw.

The carriage is provided with a longitudinally extending channel 37 terminating at one end thereof in a downwardly extending slot communicating with the bore 27. A latch 38 is pivotly mounted in the channel by means of a pivot pin 39 carried by the carriage and said latch is formed at the inner end thereof with a depending member 40 extending through said slot into the bore and engaging the threads of the screw 31, whereby rotation of the screw will move said carriage longitudinally along said rail. The outer end of the latch is provided with a finger piece 40' and a coil spring is positioned in a socket formed in the carriage adjacent the outer end thereof and engages the under face of said latch at said end to normally maintain said latch in engagement with the screw. However, by disengaging the latch from the screw, the carriage may be moved longitudinally over the rail independently of the screw.

The end of the work-holder, adjacent the saw 21', is formed with a transversely extending square-shaped slot 41 in which is slidably mounted a similar shaped sleeve 42 terminating at the outer end thereof in an upwardly extending section formed with an offset jaw 43 adapted to engage a slug 44 as hereinafter described. The inner end of said sleeve is formed with a threaded bore adapted to coact with a screw 45 rotatably mounted on the front of the work-holder. The screw is provided with a finger wheel 46 for operating the same whereby the sleeve is adapted to be reciprocated within the slot 41 to move the jaw 43 into or out of clamping engagement with the slug 44 as may be desired.

The mitre block or auxiliary carriage 30 is of a substantially triangular-shaped configuration in plan view and is provided with the heretofore mentioned pin 36' for engagement in the opening 36 for detachably mounting said mitre block to the depending section 35. Said mitre block is formed with a hypotenuse face 48 which terminates, at the upper end thereof, in a work-holder arm 49 having a face 50 coextending with the face 48, said face 50 terminating, at the lower edge thereof in an offset right angular disposed shoulder 51. Said shoulder 51 coacts with the face 50 to form a seat for the slug 44. The upper face of the shoulder 51 is flush with the top face of the work-holder 23.

The auxiliary carriage 30 is positioned within the seat 29 of the work-holder and maintained in alignment therewith by engagement with the wall 28, section 35 and pin 36'. A stop member 52, extending from a side wall of the work-holder, engages the lower end of the shoulder 51 to limit the forward movement of the auxiliary carriage. The end of the work-holder, adjacent the saw 21', is positioned relative to said saw to effect a clearance whereby portions of slugs extending beyond said end will be severed or cut when the work-holder is moved or rocked towards the saw.

The top face of the rail is graduated whereby the carriage may be readily positioned relative thereto for the purpose of gauging the length or cut of a slug. Likewise, the upper face of the auxiliary carriage is graduated whereby the slug may be adjusted therein a desired length to be cut.

The motor 20 is provided with a shield 53 extending over the saw 21 and the lower end of said shield has connected thereto a guide member 54 extending into the opening 17 whereby scrap from the cutting operation is discharged through the opening 17 and into the scrap box to prevent said scrap from accumulating about the saw, the saw being disposed above said openings.

In operation, the slug is positioned on the auxiliary carriage, engaging the faces 48, 50, 25 and shoulder 51 and the carriage 34, including the auxiliary carriage 30 attached thereto, is moved longitudinally of the rail to position the inner end of the auxiliary carriage in alignment with the end of the work-holder adjacent the saw. This operation is accomplished by disengaging the latch 38 from the screw 31 and moving the carriage independently of said screw. Release of the latch 38 to effect engagement with the screw permits the screw to move said carriage for a fine or minute adjustment whereby the end of the auxiliary carriage is brought into flush relation with the end of the work-holder.

Upon completion of the adjustment of the carriages as heretofore described, the slug is adjusted relative to the faces 48 and 50 whereby a portion extends beyond the end of the work-holder. In this position, the slug is clamped against the face 48 through the medium of the jaw 43 and associated parts heretofore described. The work-holder is moved towards the saw, bringing the slug into engagement therewith and resulting in a cutting of the slug. It will be noted, that the slug was mounted on the auxiliary carriage at an angle relative to the line of cut of the saw and thus the slug was cut with a mitre face.

In instances, where it is desired to cut a slug with a right angle face, the auxiliary carriage is detached and the slug adjusted in the seat 26, one end engaging the section of 35 and the other end extending beyond the end of the work-holder adjacent the saw.

From the foregoing, it will be apparent, that I have provided a machine which lends itself to cutting slugs with mitre as well as right angle faces; that due to the construction of the carriage and associated parts a minimum amount of adjustment is obtained and the ready detachability of the auxiliary carriage provides a quick and efficient means for cutting slugs with different faces as desired. Furthermore, through the medium of the guide member 54 and the opening 17, the scrap is prevented from accumulating about the saw thus eliminating possible damage thereto.

It is to be distinctly understood, that while I have shown and described my invention in connection with the cutting of slugs, the same may be utilized for cutting other similar articles and that various changes and modifications in construction may be resorted to without departing from the spirit of the invention or scope of the appended claims.

Having thus described my invention, I claim:

1. In a slug cutting machine, a work holding table, a slug cutting saw at the forward end of the table, a guide rail extending longitudinally of the table, a carriage mounted on the table to move along said guide rail, an arm pivoted to said carriage and having a depending portion adapted to fit against the side of the guide rail to move a slug therealong as the carriage is moved, said arm being arranged for lifting out of slug engaging position, said table having a longitudinal slot extending parallel to the guide rail, a feed screw mounted beneath said slot, and a feed screw engaging element movably mounted in said carriage for engagement with and disengagement from the feed screw.

2. In a slug cutting machine, a work holding table, a slug cutting saw at the forward end of the table, a guide rail extending longitudinally of the table, a carriage mounted on the table to move along said guide rail, an arm pivoted to said carriage and having a depending portion adapted to fit against the side of the guide rail to move a slug therealong as the carriage is moved, said arm being arranged for lifting out of slug engaging position, means to move said carriage along said table, a mitre block having an inclined face and having a second face adapted to engage the guide rail, and cooperating connecting means associated with the mitre block and the said arm for connecting and disconnecting the block and arm.

3. In a slug cutting machine, a work holding table, a slug cutting saw at the forward end of the table, a guide rail extending longitudinally of the table, a carriage mounted on the table to move along said guide rail, an arm pivoted to said carriage and having a depending portion adapted to fit against the side of the guide rail to move a slug therealong as the carriage is moved, said arm being arranged for lifting out of slug engaging position, said table having a longitudinal slot extending parallel to the guide rail, a feed screw mounted beneath said slot, a feed screw engaging element movably mounted in said carriage for engagement with and disengagement from the feed screw, a mitre block having an inclined face and having a second face adapted to engage the guide rail, and cooperating connecting means associated with the mitre block and the said arm for connecting and disconnecting the block and arm.

4. In a slug cutting machine, a work holding table, a slug cutting saw at the forward end of the table, a guide rail extending longitudinally of the table, a carriage mounted on the table to move along said guide rail, an arm pivoted to said carriage and having a depending portion adapted to fit against the side of the guide rail to move a slug therealong as the carriage is moved, said arm being arranged for lifting out of slug engaging position, means to move said carriage along said table, a mitre block having an inclined face and having a second face adapted to engage the guide rail, said arm having an opening therein parallel to the guide rail, and a pin fixed to the mitre block and engageable in said opening.

WILLIAM T. HENDERSON.